T. A. BRIGGS.
WIRE STITCHER.
APPLICATION FILED MAY 25, 1908.
970,461.
Patented Sept. 20, 1910.
7 SHEETS—SHEET 1.
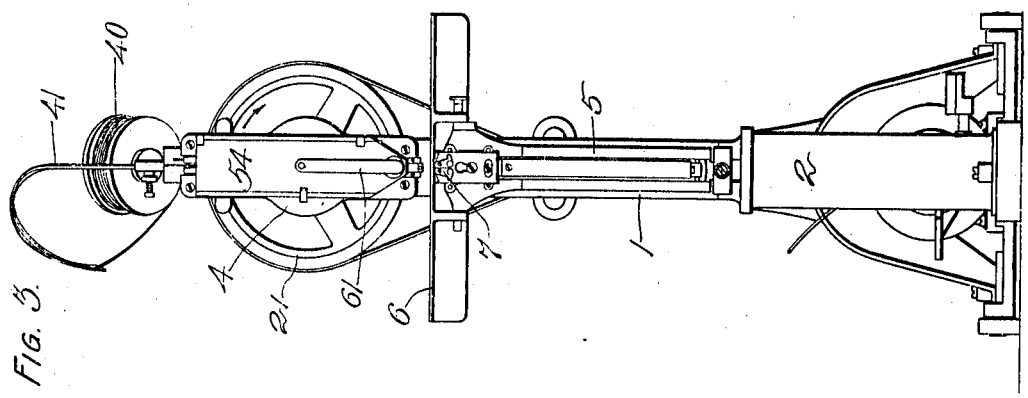
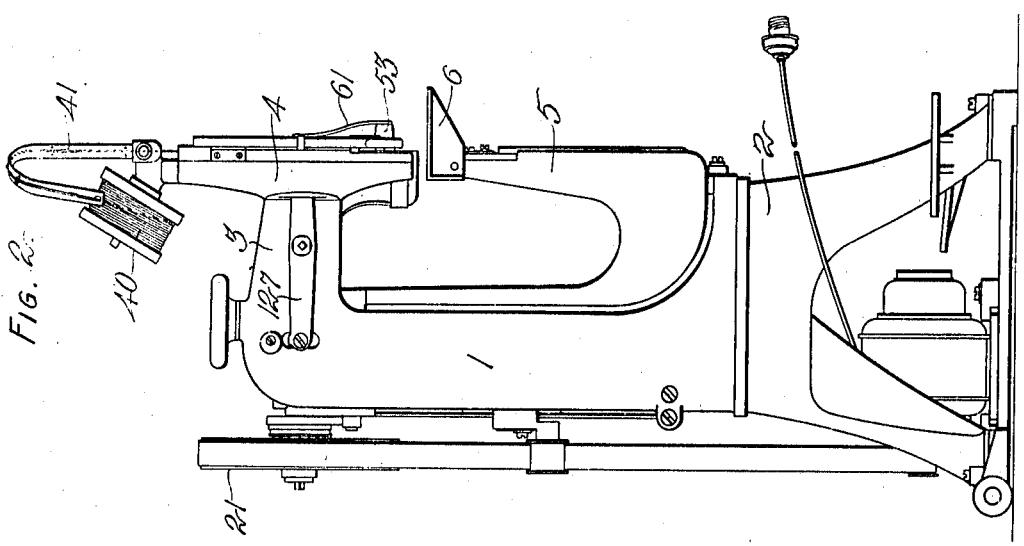
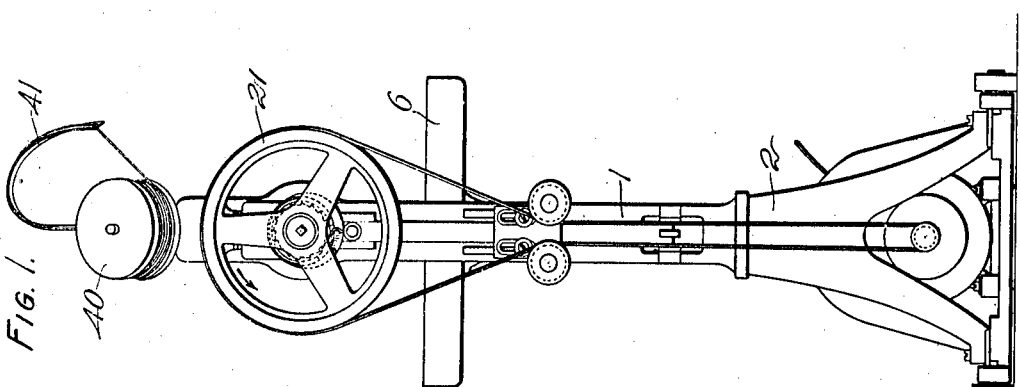
WITNESSES,
A. C. Ratigan
J. F. Richardson
INVENTOR,
T. A. Briggs
by Wright Brown Quinby May
attys T. A. BRIGGS.
WIRE STITCHER.
APPLICATION FILED MAY 25, 1908.
970,461.
Patented Sept. 20, 1910.
7 SHEETS—SHEET 2.
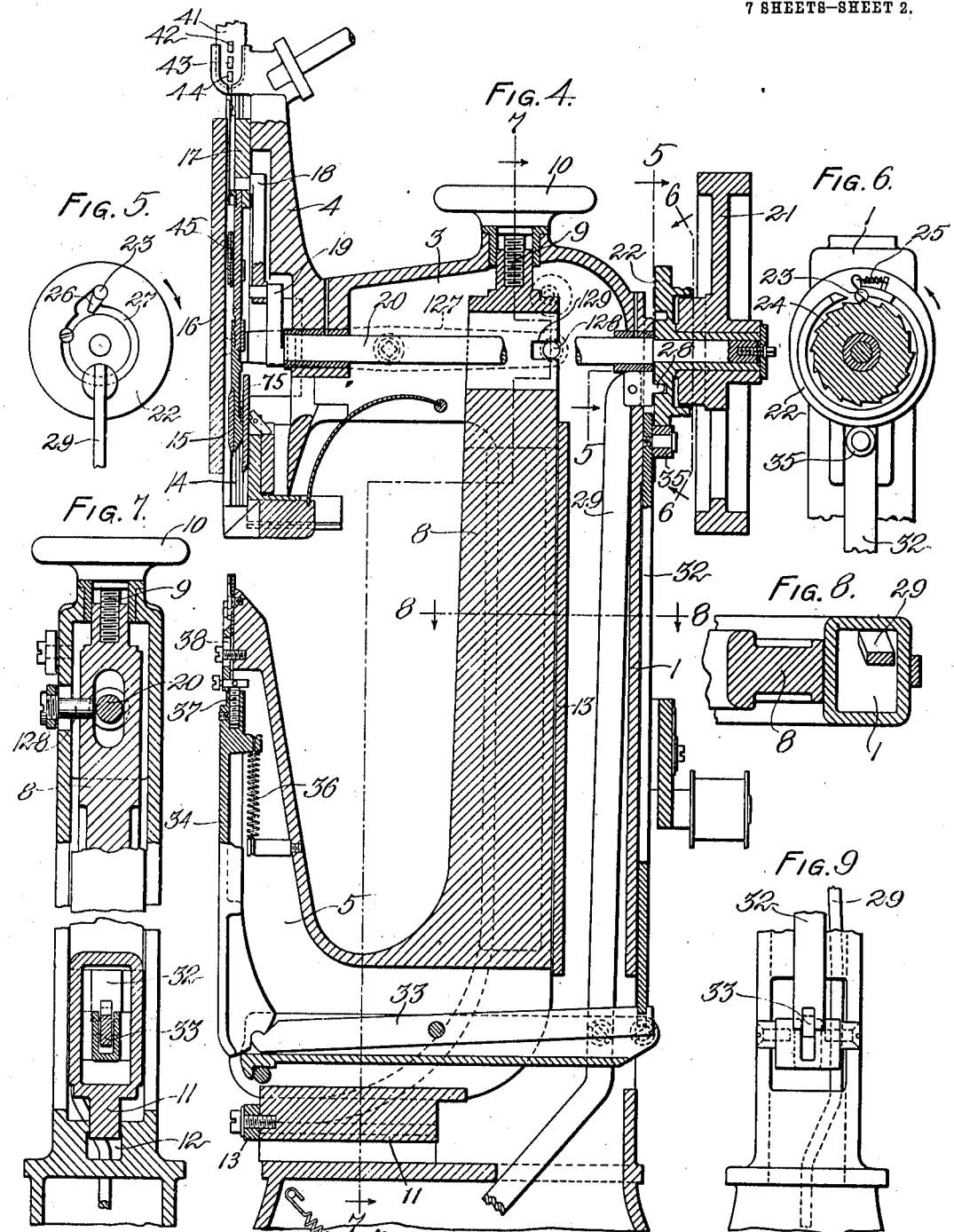
WITNESSES,
INVENTOR,

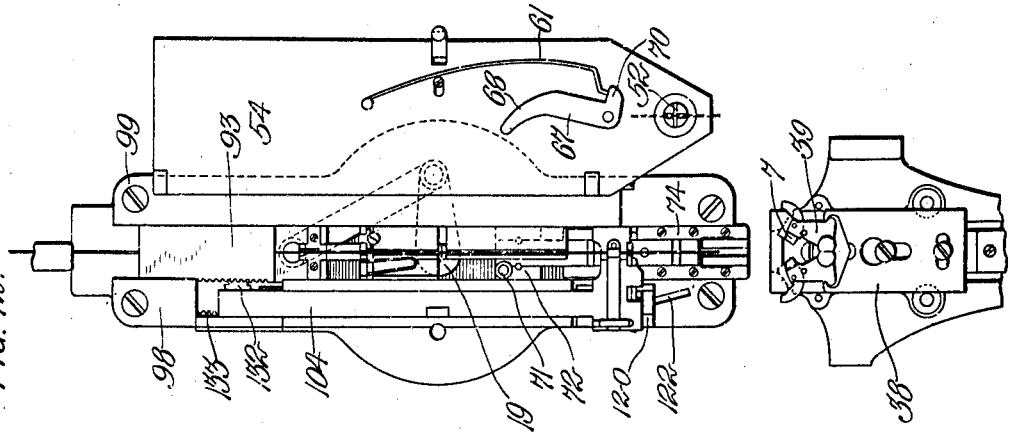
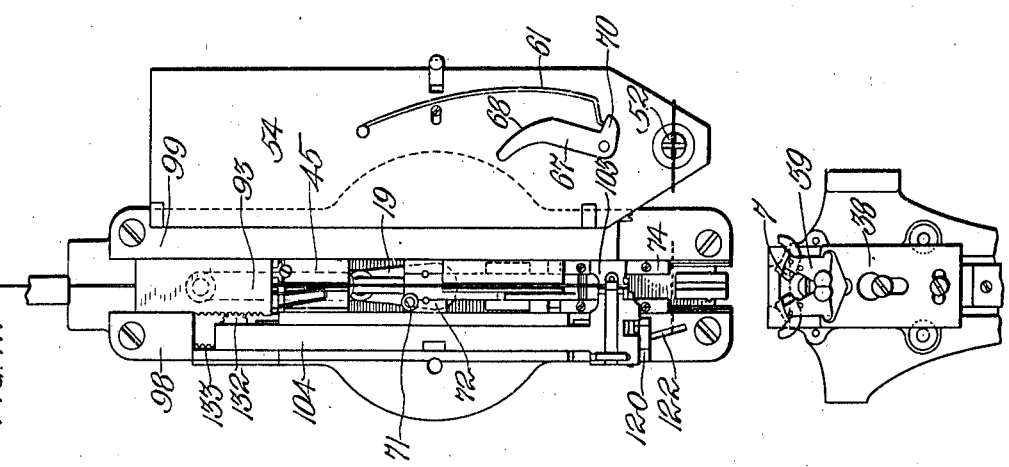
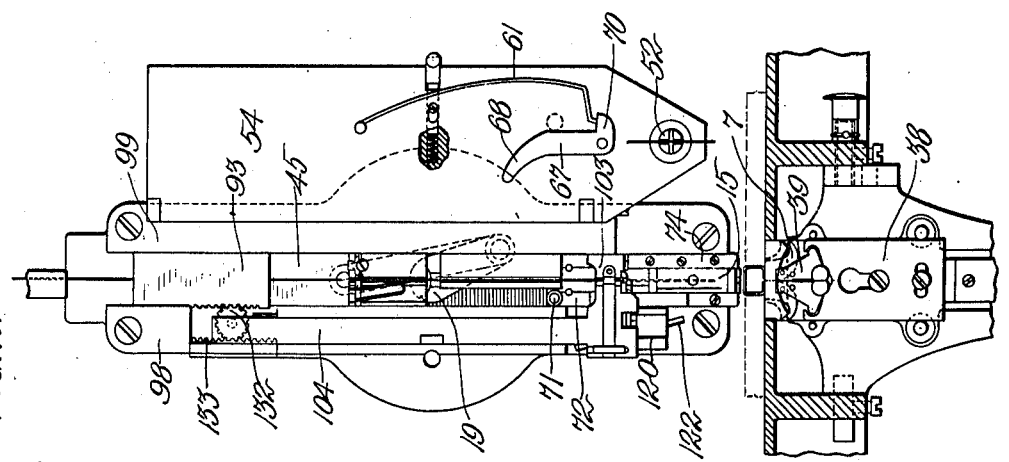

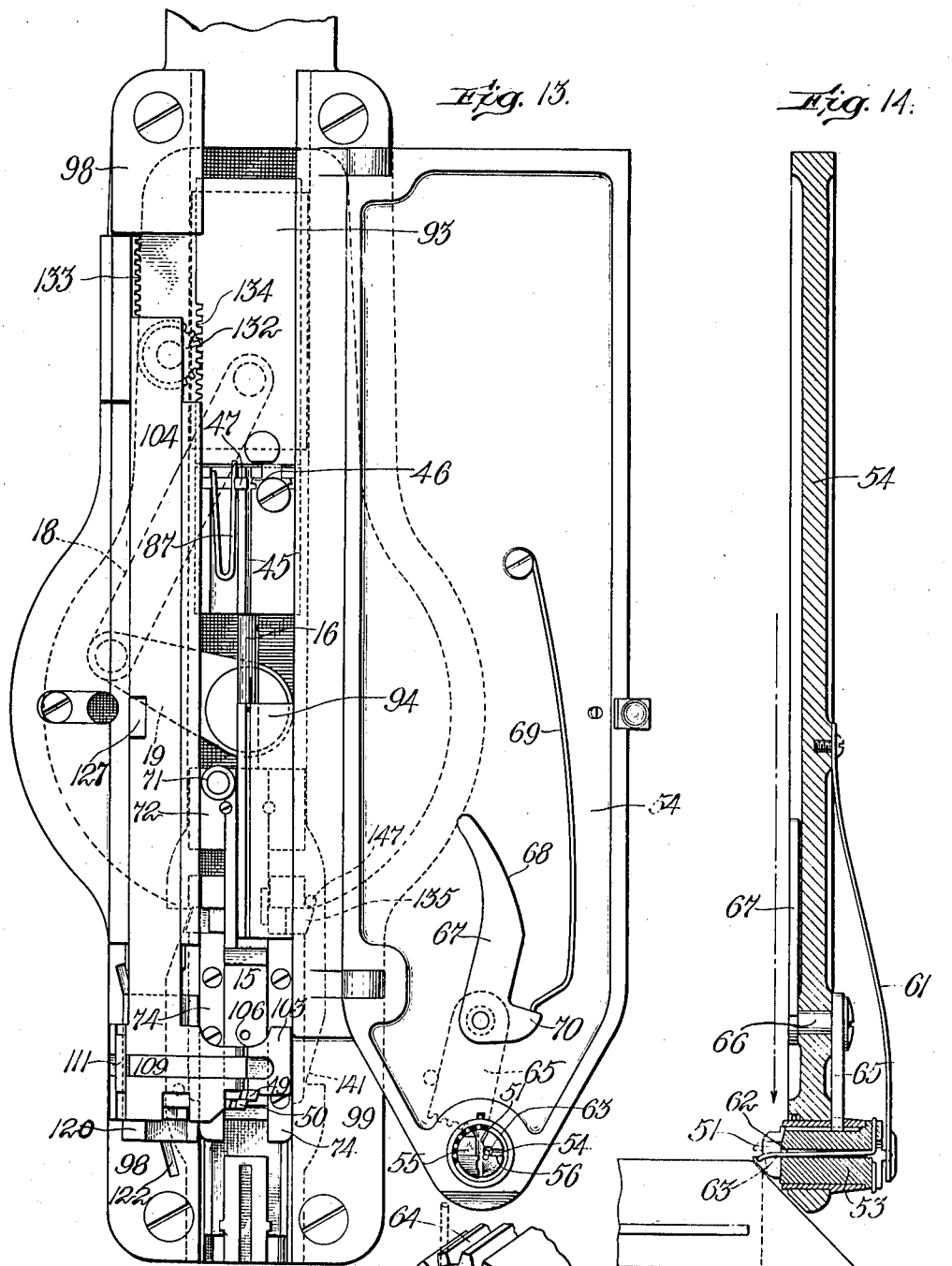

T. A. BRIGGS.
WIRE STITCHER.
APPLICATION FILED MAY 25, 1908.
970,461.
Patented Sept. 20, 1910.
7 SHEETS—SHEET 5.
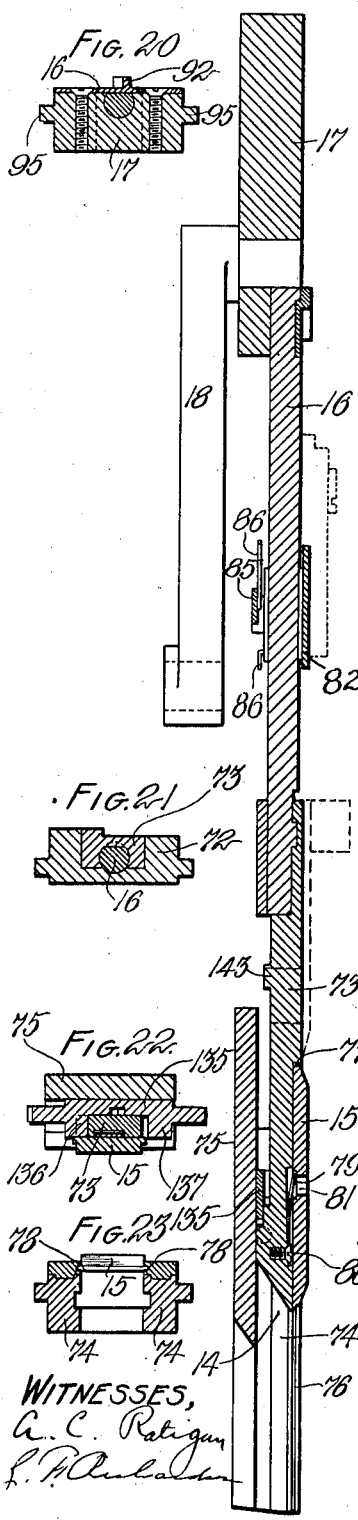
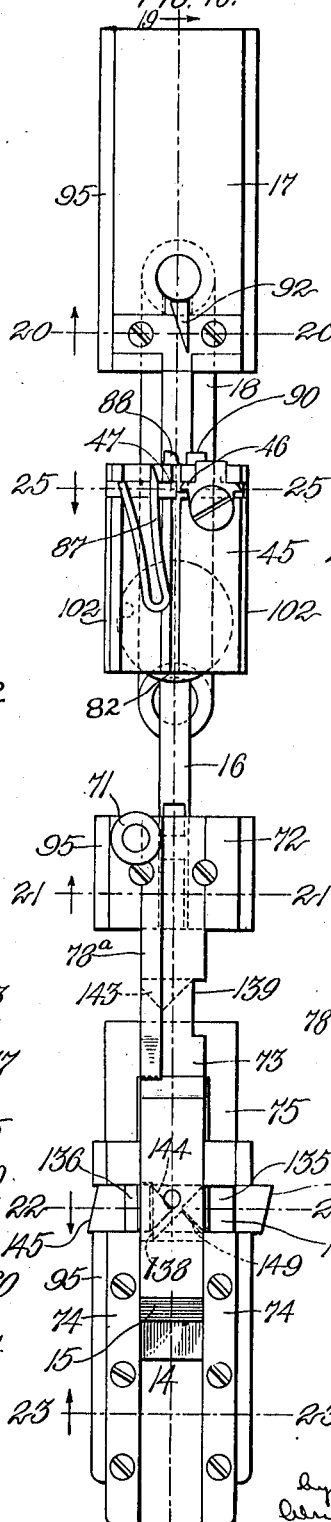
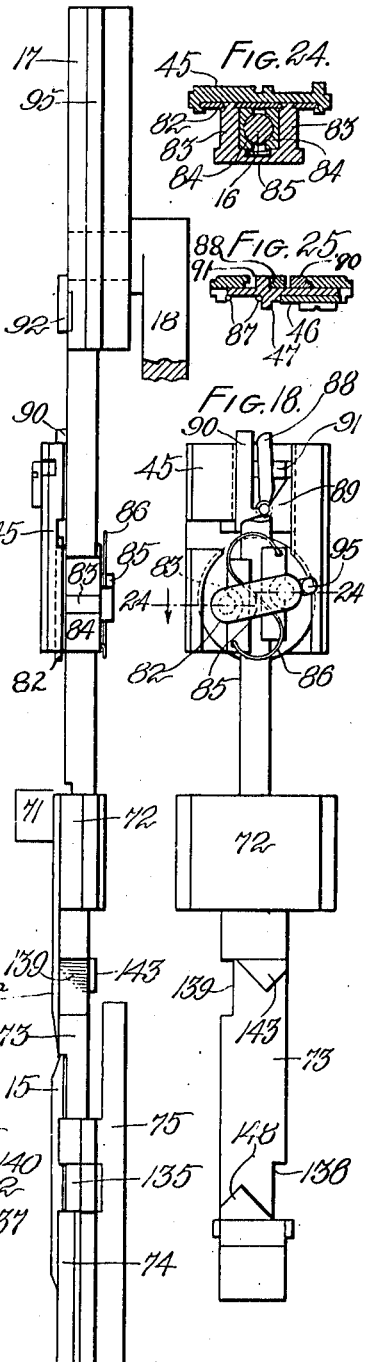
WITNESSES,
INVENTOR,

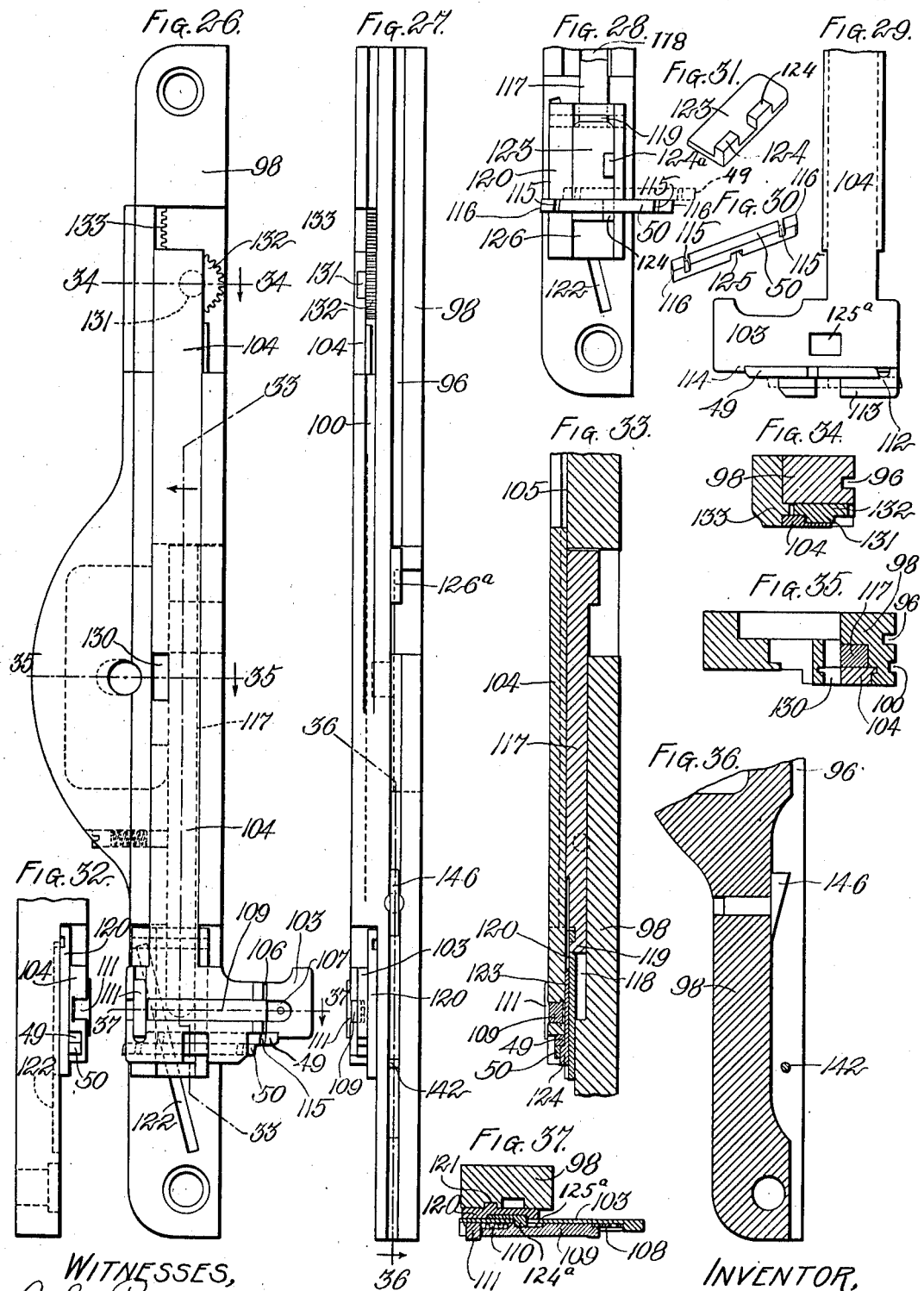

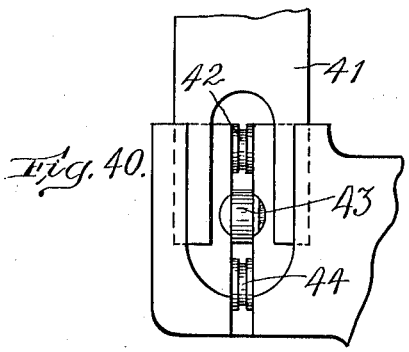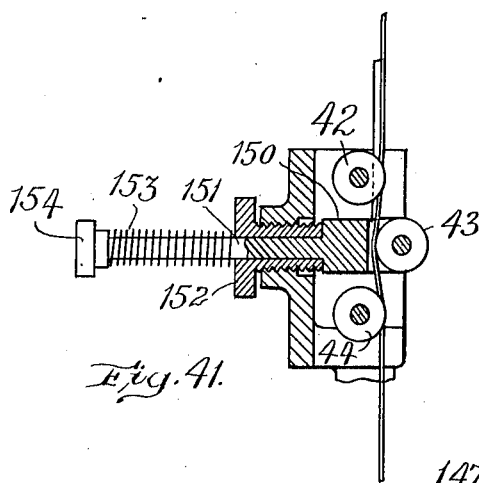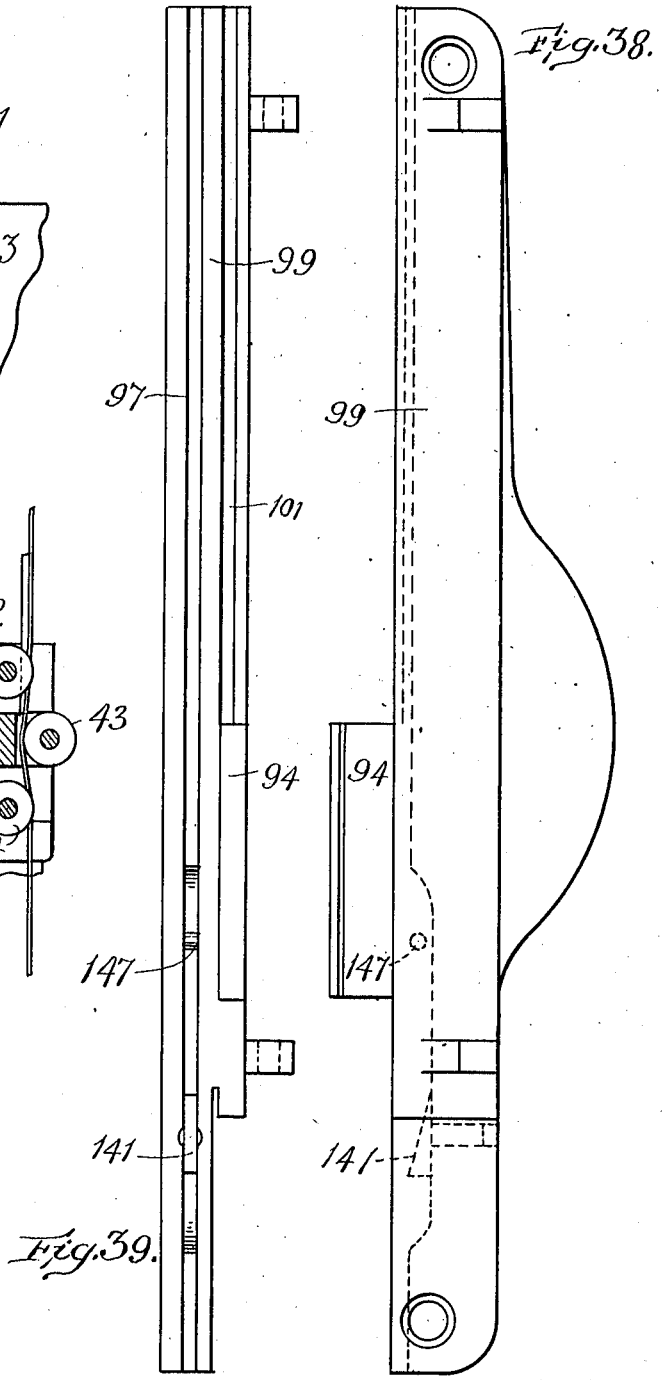

UNITED STATES PATENT OFFICE.

THOMAS A. BRIGGS, OF EAST GREENWICH, RHODE ISLAND, ASSIGNOR TO BOSTON WIRE STITCHER COMPANY, OF PORTLAND, MAINE, A CORPORATION OF MAINE.

WIRE-STITCHER.

970,461.  Specification of Letters Patent.  Patented Sept. 20, 1910.

Application filed May 25, 1908. Serial No. 435,174.

*To all whom it may concern:*

Be it known that I, THOMAS A. BRIGGS, of East Greenwich, in the county of Kent and State of Rhode Island, have invented certain new and useful Improvements in Wire-Stitchers, of which the following is a specification.

This invention relates to machines for making staples from a continuous length of wire, and driving them. It is particularly intended for fastening together sheets of paper, and is of the same general type as the machine shown in Patent No. 662,184, dated November 20, 1900.

The main features constituting the present invention are the novel wire-feeding means and staple-forming anvil with the associated connections and appliances, which permit the wire from which the staples are made to be fed down beside the driver, instead of being carried out to a considerable distance at the side; an improved wire-straightening device, which, after being adjusted to wire of any particular stiffness, can be relieved to remove and re-insert the wire without requiring a readjustment; a new type of wire cutter; and various novel features of construction which are described in the specification and particularly pointed out in the claims.

In the drawings forming a part of this specification, the preferred form of my invention is illustrated.

Figure 1 represents a rear elevation, Fig. 2 a side elevation, and Fig. 3 a front elevation of the complete machine embodying the elements of the invention. Fig. 4 represents a sectional view of the operative parts thereof taken on a vertical plane extending centrally from front to rear. Fig. 5 represents a detail of a stop motion for causing the machine to make and drive one staple and then stop, taken on line 5—5 of Fig. 4. Fig. 6 represents an elevation of a clutch forming part of this stop motion, taken on line 6—6 of Fig. 4. Fig. 7 represents a vertical section on line 7—7 of Fig. 4, illustrating the adjustment for work of different thicknesses. Fig. 8 represents a section on line 8—8 of Fig. 4. Fig. 9 represents a fragmentary rear elevation, showing the parts which operate the staple clenchers. Figs. 10, 11 and 12 represent elevations of the front of the machine, showing the operating parts in different positions. Fig. 13 represents a similar view on an enlarged scale, showing the position of the parts which they normally occupy when at rest between operations. Fig. 14 represents a sectional view illustrating the anvil forming a part of the present invention, and the manner in which the same is mounted. Fig. 15 represents a perspective view of the anvil. Fig. 16 represents an elevation of the staple driver, the operating bar for the same, and the wire feeder and staple former associated therewith. Fig. 17 represents an elevation of the same, as seen from the right of Fig. 16. Fig. 18 represents a partial elevation of the same as seen from the rear of Fig. 16. Fig. 19 represents a sectional view of the same on line 19—19 of Fig. 16. Figs. 20, 21, 22 and 23 represent sectional views taken on lines 20—20, 21—21, 22—22 and 23—23 respectively, of Fig. 16. Fig. 24 represents a section on line 24—24 of Fig. 18. Fig. 25 represents a cross-section on line 25—25 of Fig. 16. Fig. 26 represents an elevation of the left-hand guide for the driving mechanism, showing also the wire-cutter and its carrier. Fig. 27 represents an elevation of the same parts, as seen from the right of Fig. 26. Fig. 28 represents an elevation of the lower part of the guide with the cutter carrier removed, showing the devices for operating the cutter. Fig. 29 represents a rear elevation of the cutter carrier detached. Fig. 30 represents a perspective view of one of the knives constituting the wire cutter. Fig. 31 represents a perspective view of the member through which motion is imparted to this knife from the actuator. Fig. 32 represents an elevation of the parts shown in the lower portion of Fig. 26, as viewed from the left of said figure. Figs. 33, 34 and 35 represent sectional views on lines 33—33, 34—34 and 35—35, respectively, of Fig. 26. Fig. 36 represents a section on line 36—36 of Fig. 27. Fig. 37 represents a section on line 37—37 of Fig. 26. Figs. 38 and 39 are front and side elevations respectively, of the right-hand guide for the driving, staple-forming and wire-feeding devices. Fig. 40 represents a fragmentary elevation showing the wire straightener. Fig. 41 represents a sectional elevation of the wire straightener.

The same reference characters indicate the same parts in all the figures.

The machine consists of a main frame or column 1 supported upon a base or pedestal 2, and having an arm 3 carrying a head 4 in which is contained the wire-feeding, staple-forming, and staple-driving devices. Connected with the main frame is a jack 5 carrying a work-support 6 and clenchers 7 for bending the legs of the staples together on the under side of the work. The manner in which the jack is attached to the main frame is illustrated best in Fig. 4, which shows that the jack is U-shaped, and has its longer limb 8 partly contained within the column 1 and held by a screw 9 which is threaded into its upper end and has a rim 10 resting upon the top of the column, by which it may be turned by hand to adjust the jack up and down. The lower part of the jack has a rib 11 entering a groove 12 in the bottom of the main frame, by which it is restrained from lateral movement, while backward movement is prevented by a block 13 on the front end of the rib.

Fig. 4 illustrates generally the parts of the machine and their manner of operation. 14 is the staple former and 15 the staple driver, both of which are connected with a bar 16 depending from a cross-head 17, the latter being connected by a connecting rod 18 with a crank 19 on the drive shaft 20. This shaft is driven by a pulley 21 which receives its power by a belt, or otherwise, from a suitable source. The pulley is loose on the shaft, but is connected when a staple is to be made and driven, by the clutch shown in Figs. 5 and 6. This clutch consists of a disk 22 secured to the shaft and having journaled in it a pin 23, one end of which projects over the hub 24 of the pulley. This hub has teeth, and the pin 23 at the end which projects over the teeth is slabbed off so that it may be turned to engage any one of the teeth, or to permit the teeth to pass by it without engagement. A spring 25 tends to turn the pin so that it will engage the teeth. On the other side of the disk is an arm 26 which is connected with the pin and extends into a groove 27, wherein lies a projection 28 carried on the end of an operating lever 29. When the arm 26 engages the projection, it is turned so as to hold the clutching end of the pin 23 away from the teeth on the pulley hub, but when the projection 28 is withdrawn from groove 27, by depression of a treadle 30 on the lower end of the lever 29, the trigger arm is released and the pin allowed to engage one of the teeth. As long as pressure is applied to the treadle to hold the pin out of the slot, the machine will operate, but when the treadle is released, a spring 31 returns the lever to normal position, returning the pin to the slot, so that during the next rotation, the trigger arm is deflected, and the clutch disconnected. The clenchers are also operated through the clutch disk 22, by means of the periphery of the latter, which is eccentric, a rod 32, lever 33, and slide 34. The rod 32 carries a roll 35 which bears against the eccentric periphery of disk 22 and is held there by a spring 36 which draws downward upon the slide 34. The latter carries an adjustable screw 37, the head of which enters a slot in a sliding plate 38 which engages the levers 39 by which the clencher jaws 7 are carried.

One of the main features of the present invention is the construction and arrangement of the parts, which permit the wire to be fed within the head 4 in a direction parallel with and near to the driver. This avoids what was previously considered the necessity of having the wire carried out beside the head on a wide curve and fed in at right angles to the direction of drive, and thereby renders the machine more compact, making possible the mounting of several heads together, if desired, to produce a gang machine. To accomplish the new result, the blank severed from the wire to make a staple must be turned from its vertical position, or the position parallel to the direction of drive, to a transverse position. For this purpose I provide a rotary anvil which is oscillated through ninety degrees to engage the wire when it is fed, and returned to carry the severed blank into a transverse position across the path of the staple-former and driver. The wire is contained in bulk on a spool 40 and led therefrom around a guide 41 into a vertical central position above the front of the head. It passes between straightening rolls 42 43 44 above the head to a feeder 45 carried by the driver bar 16. This feeder is clamped to the bar 16 and has wire-gripping jaws 46 47. As it travels up and down with the driver, it grips the wire at successive points, and advances it at each downward stroke of the bar in a direction parallel to and a slight distance in front of the driver. The lower end of the wire passes through a guide 106 (Fig. 13), and between the knives 49 50, by which blanks to form the staples are sheared from the end, and into the vertical groove 51 of an anvil 52. This anvil is formed upon a cylindrical block 53 which is journaled in a bearing in the front plate 54 of the head. This front plate is preferably hinged to the head so that it can be swung open to expose the mechanism, as shown in Figs. 10, 11, 12 and 13, and when closed, it holds the anvil so that its end extends into the path of the driver and between the legs of the staple former.

The construction of the anvil is best shown in Fig. 15. It has besides the groove 51, a second groove 54 at right angles thereto, and of less depth, one of the walls of which at the ends 55 56 constitutes the shoulders over which the ends of the wire blank 57 are bent to form the legs of the staple. One of the upper quadrants between the slots 51 and 54 is cut away and beveled as at 58, and the diametrically opposite lower quadrant is beveled at 59. The other upper quadrant, however, is continued to the extreme end of the anvil and provided with a sloping surface 60 which is engaged by the driver, and by which the forming shoulders are retracted out of the path of the driver. To permit this retraction, the anvil block is mounted so that it can move axially as well as rotarily in its bearing, and is pressed inward by the flat spring 61 on the outside of the cover plate 54. There is a central longitudinal aperture 62 in the anvil block in which is contained a spring rod or wire 63 which serves as a retainer to overlie the blank and hold it when it is supported on the shoulders 55 56. The periphery of the block is provided with spur teeth 64 with which mesh teeth on the segmental end of a lever arm 65. This arm is secured to a stud 66 contained in the plate 54, and on the same stud, but on the inside of the plate, is an arm 67 having a cam surface 68. A spring 69 engages a projection 70 on the lever arm 67 and normally holds the parts in the position of Fig. 13, wherein the shoulders 55 56 are horizontal or transverse to the path of the staple former and the driver. When the anvil is fully projected, the groove 51 is vertical and in the path of the wire, which enters the groove as it is fed. When the driver nears the end of its stroke, a roll 71 carried on a slide 72 attached to the driver bar, engages the cam surface 68 and swings the arms 67 and 65 so as to rotate the anvil through a quarter turn and bring its groove 54 vertical. Before this occurs, the driver engaging the sloping surface 60, retracts the block. This retraction and the beveled surfaces 58 59 together enable the wire to slip from the deep groove 51 into the shallower groove 54, so that the shoulders 55 56 may bear against the wire. When the wire has been thus engaged, and is under the retainer 63, the cutting knife 50 is actuated at the extreme end of the driving stroke, to sever the wire. Upon return of the driver and disengagement of the roll 71 from the cam surface 68, the spring 69 returns the parts to their normal position, carrying the blank 57 into a horizontal location, and the spring 61 advances it into the path of the staple former, ready to be bent into a staple upon the next descent of the former. The staple former, driver and wire feeder descend together, and each downward trip forms one staple, drives it, and provides a blank ready to be formed upon the next trip.

In order to understand the construction and operation of the wire-feeding and staple-forming devices, reference may be had to Figs. 16 to 25. The driver bar before referred to is secured at its upper end to a cross-head or slide 17, and at its lower end is mortised to a prismatic bar 73. The slide 72 already referred to is connected at this junction and serves to hold the bars 16 and 73 together. On the lower end of the bar 73 is detachably fastened the driver head or plate 15, while embracing the opposite sides of the bar and head are the legs 74 of a staple former. The staple former legs are united at the rear of the bar by a plate 75. The inner sides of the staple former legs are grooved, as shown at 76 (Fig. 19), and the outer face of the bar 73 is recessed or slabbed off flush with the rear guides of these grooves, thereby providing a shoulder 77. There is a rib 78$^a$ on the bar 73 which extends slightly over the shoulder 77. The driver head 15 is double-ended and has flanges 78 which lie in the grooves 76. When the driver is thus engaged in the grooves and placed against the shoulder 77, it is secured by a spring 79 fastened in a recess in the front of the driver bar by a screw 80. Its free end springs outward and enters a recess in the rear of the driver, bearing against the wall thereof to prevent movement of the driver away from the shoulder 77. A hole 81 in the driver admits an instrument to push back the spring 79 so as to release the driver, enabling it to be removed and reversed or replaced by another, and also enabling the staple former to be unlocked and removed from the driver bar.

The wire feeder 45 consists of a plate in the rear of which is held a disk 82. Connected to this disk are pins or bars 83 which contain between them clamps 84 and are connected by a yoke 85. The clamps embrace the bar 16, and are held frictionally against it by a spring 86 and the reaction of the yoke 85 and disk 82. The tendency of the spring, the form of which is shown in Fig. 18, is to move one of the clamps upward and the other downward, thus inclining the yoke 85, with the result that the clamps are drawn together. Of the wire jaws, the one marked 46 is fixed, and the other movable, being impelled toward the jaw 46 by a spring 87. On the rear of the feeder plate is a lever 88 pivoted to a plate 89 from which the extension 90 rises. This lever engages a lug 91 upon the movable jaw 47 and is adapted to be engaged by a wedge 92 on the cross-head 17. When the wedge is inserted between the projection 90 and lever 88, it moves the latter in such a way as to separate the jaws and release the wire. This occurs on every upward movement of the feeder and is caused to take place by means of stops which arrest the feeder at each end of its travel before the driver has completed its stroke. These stops are shown in Figs. 10, 11, 12 and 13, one of them being 93 and the other 94. In its downward movement, the feeder, or rather the projecting limb of the disk 82, strikes the stop 94. As this disk is held by pin 95, near the higher of the bars or pins 83, so that it cannot move up or down at this point, the effect is the same as though the disk were slightly raised relatively to the feeder. The clamp-holding pins 83 are then brought more nearly into the same horizontal plane, and the clamps are loosened. The feeder slide then stops while the driver continues. At the end of this movement the wedge 92 enters between the parts 88 and 90 and releases the wire clamp. When the driver returns, it carries the feeder slide, which is again automatically clamped as soon as the upward movement commences, upward also. The gripping jaws are meanwhile held separated by the wedge 92 and slip past the wire. At the upward limit of travel, the feeder strikes the stop 93 and is arrested, while the driver bar continues. The wedge 92 then retracts and allows the jaws to close again upon the wire ready to feed it downward upon the next forward stroke of the driver. All of the parts, except the feeder 45 and the roll 71, are behind the stops 93 and 94, and the roll 71 is beside the latter, so that all freely pass by these stops with the exception of the slide.

The cross-head 17, slide 72 and staple former have lateral ribs 95 which are guided in grooves 96 97 of guide pieces 98 99 which are bolted to the opposite sides of the front of the head 4. These guides also have grooves 100 101, respectively, which receive ribs 102 on the edges of the feeder 45. In the latter grooves also are contained the edges of the stop 93 which is adjustable by means which will be presently described, to vary the height at which the wire feeder is stopped, and thereby to vary the length of blank fed to make the staples.

The cutter, which consists of the knives 49 and 50, is carried by a bracket 103 projecting from a slide 104 which is vertically adjustable in a guideway 105 in the front face of the left-hand guide 98. This bracket extends in front of the driver across the path in which the wire is fed, and has a vertical groove 106 to contain the wire. This vertical groove is intersected by a horizontal one 107 in which is a fixed wire-clamping jaw 108 (Fig. 37) and in which slides a movable wire clamp 109. The latter is resiliently pressed against the fixed clamp by a spring 110 (Fig. 37) which abuts against a key 111. The clamp has a lip overlying the wire and preventing it from slipping out of the groove 106. The pressure exerted by this clamp on the wire is sufficient to prevent it being drawn backward when the wire feeder rises. At the lower end of the bracket 103 and on the rear side thereof is a groove 112 which receives the cutter knife 49, there being a lip 113 which lies under and supports the lower knife 50. The upper wall of the groove is provided with an offset shoulder 114 against which one end of the knife 49 is adapted to abut, and by which it is positioned. When in this position, a groove 115 in the knife is in line with the wire groove 106 of the bracket. The key 111 before referred to, which serves as the abutment for retaining the wire clamp 109 and spring 110 in place, extends down and overlaps the end of the knife so as to hold it against shoulder 114. These ends are somewhat beveled so that the knife engages the shoulder and key without looseness. It is supported by the lower knife 50 which rests on the lip 113. These knives 49 and 50 are duplicates of each other, and one of them is shown in perspective in Fig. 30. They are reversible and interchangeable, each having a cutting edge 116 at each end, and having two grooves 115 near the ends. Each knife can be turned end for end, and either one may be clamped to the holder in the manner described, and when so clamped, one of the grooves is in line with the groove 106 of the holder. The lower edge of this groove is sharp and cooperates with the end cutting edge of the lower knife to shear off the wire.

It will be noted that the upper knife is fixed and the lower one movable, this knife being operated by the driver through mechanism which transmits the vertical movement of the driver into horizontal movement of the knife, and permits the knives to be adjusted vertically without changing their positions relatively to each other. This mechanism consists of an actuating bar 117 which is set into a guideway 118 in the guide-piece 98 behind the slide 104, and which has a tongue 119. A plate 120 has a horizontal groove in its rear face which receives this tongue and is supported thereby. On the rear face of the plate is a tongue 121 which enters a diagonal cam slot 122 in the face of the guide 98. When the actuator 117 is moved vertically, the sliding plate 120 is moved up and down, but guided by the slot so as to travel laterally, the tongue 119 permitting such movement. This lateral motion is communicated to the lower knife 50 by a key-plate 123 (Figs. 28 and 31) which has a key projection 124 entering a notch 125 in the rear side of the movable knife. This key-plate is set into a vertical groove 126 in the plate 120 and has a second projection 124 which enters an opening 125ª in the bracket 103, by which it is supported. The sliding connection between the key-plate 123 and plate 120 prevents the vertical component of the latter's motion from affecting the key-plate, which is held against vertical displacement by the walls of the aperture 125ª, but the lateral component of the motion of plate 120 is transferred to the key-plate through the walls of the groove 126, and by the latter transmitted to the movable knife. On the actuator 117 is a lug 126ª which projects in the groove 96 and is struck by the cross-head 17 near the end of its downward movement, and by the slide 72 near the end of the upward movement of the driver. Thus the cutter is actuated at the extreme end of the driving motion when the previously-formed staple has been driven into the work, and after the anvil has been turned to engage its forming shoulders with the wire. The key plate by its rib 124ª also operates the wire clamp 109, causing it to release the wire when the driver is elevated and the knife 50 is withdrawn, and permitting it to grip the wire under the force of its spring 110 when the driver is down and during the rise of the driver.

The cutter may be adjusted vertically to sever blanks of various lengths for different classes of work. This adjustment is made simultaneously with that of the jack. As previously described, the hand-wheel 10 serves to move the jack vertically. Operated by the jack is a lever 127 (Figs. 2 and 4) which has a pin 128 entering a slot 129 in the jack. The forward end of this lever projects into a notch 130 in the side of the cutter-carrying slide 104. The lever is pivoted at its center so that the arms engaging the jack and slide are of equal length. Thus as the jack and work-support are adjusted for work of different thicknesses, the cutter is correspondingly and oppositely shifted. At the same time, the amount of feed is adjusted so that both legs of the staple will be altered in length to correspond with the difference in the work. This requires that the difference in the length of blank fed should be twice the amount by which the work-support and knife-holder are adjusted. Accordingly, the stop 93, which limits and governs the feed, is adjusted through the slide 104 by connections which give it this double movement. In the upper end of the slide is held the journal 131 of a pinion 132 which meshes on one side with a fixed rack 133 held upon the guide 98, and on its other side meshes with rack teeth 134 on the side of the stop 93. Thereby the motion communicated to the stop is double that given to the slide 104.

The staple former is operated directly by the driver bar, and is positively connected thereto considerably in advance of the driver when the staple is being formed. It is afterward disconnected so that it may remain stationary while the driver advances to force the staple into the work. The connection is made by a key 135 which is arranged to slide transversely in the staple former back of the driver bar, and has projections 136 137 adapted to engage notches 138 139, respectively, in the opposite sides of the driver bar. When the parts are in the position shown in Fig. 16, the key is engaged with notch 138 and the former is connected so as to bend over the ends of the staple blank. When the staple has been formed, the beveled end 140 of the key slide strikes a wedge cam 141 set in the guideway 97 of the right-hand guide 99, and is moved to the left, disengaging the key from the notch. A pin 142 lies in the opposite guide 96 so as to arrest the slide and prevent further movement of the staple former. Thus the driver is enabled to advance within the former to drive the staple, the legs of which are held in the groove 76 of the former. When the driver is at the end of its stroke, a wedge 143 on the rear of the driver bar strikes an inclined surface 144, shown in dotted lines in Fig. 16, and thrusts the key-slide to the left far enough to engage the projection 137 with the notch 139. This notch then lifts the staple former upon the return of the driver until the beveled surface 145 on the left-hand end of the key-slide strikes a wedge cam 146 in the guideway 98. This disengages the key and thrusts it over to the right so that it will be arrested by a pin 147 in the guide 99, and the driver will be allowed to continue to the upper limit of its stroke, while the staple former remains stationary. The wedge 148 on the driver bar then engages an inclined surface 149 on the key-slide and moves the latter over so as to again enter the notch 138. This manner of connecting the staple former to the driver bar allows the former to be lifted out of the way of the anvil immediately after a staple has been driven, and allows it to be reconnected with the driver bar in operative relation for bending the staple.

The wire-straightener is an important part of the present invention. This consists of two or more abutments on one side of the wire and an intermediate abutment on the opposite side of the wire, which are arranged so as to offset the wire between them in the direction opposite to the set given to it by its winding on the spool, and can be adjusted to any amount desired. The abutments preferably take the form of anti-friction rolls, of which those designated 42 and 44 on one side of the wire are mounted upon fixed pivots, while the roll 43 on the other side of the wire is journaled in a carrier 150. This carrier has a shank 151 which passes through a sleeve 152 and is surrounded by a spring 153 abutting against this sleeve and against a head 154 on the outer end of the shank. The inner end of the sleeve serves as an abutment against which the carrier 150 is drawn by the spring. The sleeve is threaded into the machine frame and is adjustable so that the pressure exerted by the spring through the roll 43 upon the wire, and the amount by which the wire is drawn inward between the rolls 42 44, may be varied. As the shank slides freely through the sleeve in a direction opposed to the tension of the spring, the roll 43 may readily be thrown out to relieve the wire and allow it to be removed and inserted into the straightener. The spring then returns the holder against the stop, which locates the movable roll 43 in the same position that it occupied before without necessitating any readjustment.

I claim:—

1. A wire stitcher, comprising a driver, a wire feeder reciprocable in the same directions as said driver, wire severing means, mechanism for changing the limits of travel of said wire feeder and correspondingly adjusting the position of said severing means to vary the length of staple blanks cut from the wire, means for turning the blanks at right-angles to the feeding and driving direction, and a staple former operable to form said blanks into staples having their legs extending in the driving direction.

2. A wire stitcher comprising mechanism for feeding wire in the direction of drive, wire-severing means, a rotary anvil, and means for turning said anvil and a severed length of the wire to bring the latter perpendicular to the line of feeding and driving to enable a staple to be formed with its legs pointing in the proper direction.

3. A wire stitcher comprising mechanism for feeding wire in the direction of drive, an anvil having forming shoulders and a recess to receive the wire as it is fed, and means for turning said anvil so as to lay the wire across the forming shoulders and then turning the anvil and the portion of the wire which is engaged therewith into transverse position so that a staple having its legs extending in the driving direction may be formed from such length of wire.

4. A staple forming and driving machine comprising a staple former, a driver, means for feeding wire to form staples in the direction of travel of said staple former and driver, a wire cutter, and means for carrying a severed length of the wire into and holding it in a position across the path of the said former and driver.

5. A staple forming and driving machine, comprising a staple former, a driver, a wire cutter, an oscillative anvil having staple forming and supporting shoulders and means for turning said anvil so as to engage said shoulders with the wire and then returning the anvil with a severed piece of the wire to place the shoulders and wire across the path of the staple former.

6. A staple forming and driving machine, comprising a staple former, a driver, means for feeding wire, to form staples, in the direction of travel of said staple former and driver, a wire cutter, a wire feeder operated to advance wire to form the staples parallel to the line of travel of said former and driver, and an oscillative anvil operable to engage the wire and turn the end thereof, after severance by said cutter, across the path of the former.

7. A machine for making staples from a continuous wire and driving the same, comprising an anvil having a supporting surface adapted to support a length of wire while the same is being formed into a staple, a staple former having limbs arranged to embrace said anvil and bend over the projecting ends of a length of wire held thereby, said anvil being also longitudinally movable against a yielding resistance out of the path of the staple former, and provided with an inclined surface at its end, a staple driver arranged to travel between the limbs of the staple former and by bearing against said inclined surface of the anvil, displace the latter from its path, a wire feeder moving in the same direction with said driver for feeding the wire parallel thereto, a cutter arranged to cut off the length of wire engaged with the anvil, and means for oscillating the anvil to engage the supporting surface thereof with the wire and carry the latter into a position across the path of the staple former.

8. A machine for making staples from a continuous wire and driving the same, comprising an anvil movable both rotarily and axially having supporting shoulders to hold the central part of a piece of wire while the ends are bent over to form the legs of staples, a beveled surface at its shoulder end and a recess or groove transverse to said shoulders; a wire feeder arranged to feed the wire parallel to the movement of said former and driver through the recess of the anvil; a wire cutter; and means for giving a back-and-forth oscillation to the anvil to locate the wire across its forming shoulders and then swing the wire into the path of the staple former.

9. A machine for making staples from a continuous wire and driving the same, comprising a longitudinally and rotarily movable anvil having a beveled end whereby it is retracted by the driver from the path of the latter, and having also a transverse groove to hold the wire while being bent into a staple and a recess to receive the wire while being fed, means for feeding wire beside and parallel with the driver into said recess while a staple is being formed and driven, means for transferring the wire from said recess to said groove, and a wire cutter.

10. A machine for making staples from a continuous wire and driving the same, comprising a longitudinally and rotarily movable anvil having a beveled end whereby it is retracted by the driver from the path of the latter, and having also a transverse groove to hold the wire while being bent into a staple and a recess to receive the wire while being fed, means for feeding wire beside and parallel with the driver into said recess while a staple is being formed and driven, means for partially rotating the anvil to transfer the wire from the recess to the groove and restore the latter to its normal position wherein it extends transversely of the path of the staple former, and a wire cutter for severing that portion of the wire which is engaged with the anvil.

11. A wire staple making and driving machine, comprising staple forming and driving devices, a wire feed for advancing wire beside and near the path in which said devices move, a cutter for severing a piece from the end of the wire to make a staple, and an anvil rotatable to turn such piece into a transverse position wherein it extends across the path of said devices.

12. A wire staple making and driving machine, comprising a reciprocating driver, a wire feeder carried with said driver for feeding wire to form the staples in a path parallel to that of the driver, a cutter to sever pieces from the end of the wire, means for turning the pieces of wire and placing them so that they lie in the path of the driver but extend transversely thereof, said means including a retainer by which the wire is gripped, and a bender arranged to travel in advance of the driver for bending over the ends of the wire to form staples before the same are engaged by the driver.

13. In a staple forming and driving machine, an anvil consisting of a block having grooves at right angles to each other in its end, one of said grooves being deeper than the other, and one wall of the other groove serving to support a length of wire while the ends thereof are bent to form the legs of a staple, the diametrically opposite quadrants between the grooves being so cut away and beveled that rotation of the anvil will cause a wire located in the deeper groove to slip into the shallower and engage the supporting wall thereof.

14. In a staple forming and driving machine, an anvil consisting of a block having grooves at right angles to each other in its end, one of said grooves being deeper than the other, and one wall of the other groove serving to support a length of wire while the ends thereof are bent to form the legs of a staple, the diametrically opposite quadrants between the grooves being so cut away and beveled that rotation of the anvil will cause a wire located in the deeper groove to slip into the shallower and engage the supporting wall thereof combined with a retainer carried by said anvil and arranged to extend over a wire engaged with said supporting wall and hold the same in contact therewith.

15. A staple forming and driving machine, comprising an anvil having supporting shoulders on its end, a groove extending between said shoulders, and a beveled surface between the under side of one of said shoulders and the groove, a spring retainer carried by said anvil and arranged so as to overlie and bear upon a wire resting on said shoulders; a back-and-forth moving staple former and driver, into the path of which the shoulders extend, a wire feeder arranged to advance the wire into said anvil groove, means for giving the anvil a partial rotation back and forth to bring the shoulders against the wire and carry the wire into a transverse position in the driver path, and a wire cutter operative while the anvil is turned to sever the wire.

16. A staple forming and driving machine, comprising an anvil having supporting shoulders on its end, a groove extending between said shoulders, and a beveled surface between the under side of one of said shoulders and the groove, a spring retainer carried by said anvil and arranged so as to overlie and bear upon a wire resting on said shoulders; a back-and-forth moving staple former and driver, into the path of which the shoulders extend, a spring tending to advance the anvil into such path, a beveled abutment extending to the extreme end of the anvil over a shoulder, by coöperation with which the driver retracts the anvil and releases the staple, a wire feeder arranged to advance the wire into said anvil groove, means for giving the anvil a partial rotation back and forth to bring the shoulders against the wire and carry the wire into a transverse position in the driver path, and a wire cutter operative while the anvil is turned to sever the wire.

17. A staple forming and driving machine, comprising an anvil having supporting shoulders on its end, a groove extending between said shoulders, and a beveled surface between the under side of one of said shoulders and the groove, a spring retainer carried by said anvil and arranged so as to overlie and bear upon a wire resting on said shoulders; a back-and-forth moving staple former and driver, into the path of which the shoulders extend, a wire feeder arranged to advance the wire into said anvil groove, teeth on the anvil, a cam lever having a toothed arm, a stud carried with the driver to engage said cam lever, by which the anvil is rotated to engage its shoulders and said retainer with the wire, a wire cutter operated while the anvil is so turned for severing the wire, and a spring engaged with said cam lever for restoring the anvil and thereby placing the severed wire across the driver path.

18. A staple forming and driving machine, comprising an anvil having supporting shoulders on its end, a groove extending between said shoulders, and a beveled surface between the under side of one of said shoulders and the groove, a spring retainer carried by said anvil and arranged so as to overlie and bear upon a wire resting on said shoulders; a back-and-forth moving staple former and driver, into the path of which the shoulders extend, a wire feeder arranged to advance the wire into said anvil groove, teeth on the anvil, a cam lever having a toothed arm, a stud carried with the driver to engage said cam lever, by which the anvil is rotated during the last part of the driving movement, to engage its shoulders and said retainer with the wire, a wire cutter operated while the anvil is so turned for severing the wire, and a spring engaged with said cam lever for restoring the anvil and thereby placing the severed wire across the driver path when the driver and staple former have returned past the anvil.

19. An anvil for a wire-stitching machine in which the wire is fed in the same general direction as the driver travels, consisting of a cylindrical block having gear teeth on its periphery, a longitudinal aperture, transverse slots across its end, shoulders formed by the wall of one of said slots, a beveled projection extending over one of said shoulders to the end of the anvil, and a flexible resilient retainer extending through said aperture so as to overlie a wire resting on said shoulders.

20. An anvil for a wire stitching machine in which the wire is fed in the same general direction as the driver travels, consisting of a cylindrical block, provisions by which it may be rotated, transverse slots across its end, shoulders formed by the wall of one of said slots, and a beveled projection extending over one of said shoulders to the end of the anvil.

21. An anvil for a wire-stitching machine in which the wire is fed in the same general direction as the driver travels, consisting of a cylindrical block having gear teeth on its periphery, transverse slots across its end, one of which slots is deeper than the other, shoulders formed by the wall of the shallower slot, a beveled projection extending over one of said shoulders to the end of the anvil, and surfaces below one of the shoulders and above the other beveled into the deeper slot.

22. An anvil for a wire-stitching machine in which the wire is fed in the same general direction as the driver travels, consisting of a cylindrical block having gear teeth on its periphery, a longitudinal aperture, transverse slots extending at right angles to each other across its end, one of which slots is deeper than the other, shoulders formed by the wall of the shallower slot, a beveled projection extending over one of said shoulders to the end of the anvil, and a flexible resilient retainer extending through said aperture so as to overlie a wire resting on said shoulders.

23. In a staple forming and driving machine having wire-feeding means, a reciprocating driver and a reciprocating staple former, an anvil having a staple-supporting portion and mounted to oscillate about an axis perpendicular to the normal position of a wire or staple on said staple-supporting portion.

24. A staple forming and driving machine, comprising a head, wire-feeding means, a driver and a staple former reciprocating in said head, a removable front plate extending across the front of said head covering the aforesaid elements, an oscillative anvil journaled in said head with its axis perpendicular to the paths of said driver and staple former, an anvil-oscillating lever pivoted to the plate on an axis parallel to that of the anvil, being engaged with the latter and having a cam surface, and a stud movable with the driver and arranged to engage said cam surface and thereby swing the lever.

25. A wire stitcher comprising mechanism for feeding wire in the direction of drive, adjustable means for severing sections of wire of various lengths, and means for turning a severed piece of the wire, of any length, into a position transverse to the feeding direction and locating the same so that a staple of the desired proportions may be formed therefrom.

26. A wire stitcher comprising staple-forming and driving means, mechanism for feeding wire in the direction of operation of said means, a wire-severing device adjustable to enable sections of various lengths to be severed from the wire, and means for placing such severed sections in a position, transverse to the movement of said forming means, such that the latter may form staples of the required proportions regardless of the length of the section.

27. A wire stitcher comprising staple-forming and driving means, mechanism for feeding wire in the direction of operation of said means, a wire-severing device adjustable to enable sections of various lengths to be severed from the wire, and means constructed and arranged to locate sections of all lengths across the path of said forming means centrally thereof.

28. In a machine of the character described, a driver bar, a staple driver attached thereto, a wire feeder carried by said bar for feeding wire, to make the staples, in the same general direction as the travel of the driver, a staple former, and means for placing a length severed from the wire into position to be bent into a complete staple by said former.

29. In a machine of the character described, a driver bar, a staple driver attached thereto, a wire feeder carried frictionally by said bar for feeding wire, to make the staples, in the same general direction as the travel of the driver, and stops for arresting said feeder to limit the amount of wire fed.

30. In a machine of the character described, a driver bar, a staple driver attached thereto, a wire feeder carried by said bar for feeding wire, to make the staples, during the operative trips of the driver, and a variably located stop for arresting said feeder on the return trip and thereby governing the length of wire fed.

31. In a staple making and driving machine, in combination, a staple former, a staple driver, a reciprocating actuator for said former and driver, by which both are reciprocated, a wire-feeder operatively connected to, and reciprocated in the same direction with the former and driver by, said actuator, and means for holding pieces of the wire while they are bent by the former into staple form.

32. In a staple making and driving machine, the combination with the staple-forming devices, driver, the reciprocating actuator for the same, and the wire cutter, of a wire feeder operatively engaged with and reciprocated by said actuator for advancing the wire during the driving stroke, and a stop for arresting said feeder prior to the reversal of the actuator to permit operation of the cutter.

33. In a staple making and driving machine, the combination with the staple-forming devices, driver, and the reciprocating actuator for the same, of a wire feeder operatively engaged with and reciprocated bodily by said actuator and arranged to grip and advance the wire during the forward or driving stroke of the actuator and to slip past the wire on its return.

34. In a staple making and driving machine, the combination with the staple-forming devices, driver, and the reciprocating actuator for the same, of a wire feeder operatively engaged with and reciprocated by said actuator, grippers on said feeder normally actuated to clamp the wire between them, and a device carried by the actuator for causing said grippers to release the wire during the return of the feeder.

35. In a staple making and driving machine, the combination with the staple-forming devices, driver, and the reciprocating actuator for the same, of a wire feeder operatively engaged with and reciprocated by said actuator, grippers on said feeder normally actuated to clamp the wire between them, a device carried by the actuator for causing said grippers to release the wire during the return of the feeder, and stops arranged to limit the movement of the feeder in each direction before the reversal of the actuator, whereby said gripper-releasing device is rendered alternately operative and inoperative, and the length of wire fed at each trip is governed.

36. In a staple making and driving machine, the combination with the staple-forming devices, driver, and the reciprocating actuator for the same, of a wire feeder operatively engaged with and reciprocated by said actuator, spring-actuated wire-gripping jaws on said feeder, and a wedge carried by the actuator arranged to open said jaws at the end of each feeding trip, and to allow them to close on the wire at the end of the return trip.

37. In a staple making and driving machine, the combination with the staple-forming devices, driver, and the reciprocating actuator for the same, of a wire feeder operatively engaged with and reciprocated by said actuator, said feeder being frictionally clutched thereto, and capable of sliding thereon, spring-closed wire-gripping jaws on the feeder, a wedge carried by the actuator for opening said jaws, and stops located to limit the movement of the feeder in each direction while the actuator continues, whereby said wedge is caused to open the jaws at the close of the feeding movement, hold them open during the return of the feeder, and permit them to close at the end of the return.

38. In a staple forming and driving machine, in combination with a driver bar, a slide having friction clamps embracing said bar, wire-gripping jaws on said slide, and stops for arresting said slide at each end of its movement, one of said stops being adjustably positioned to govern the length of wire fed.

39. In a staple forming and driving machine, in combination with a driver bar, a slide having friction clamps embracing said bar, a cross bar pivotally engaging the outer sides of said clamps, and a spring coöperating to draw the clamps against the bar, said cross bar being inclined when the clamps are gripped, and one end being restrained from movement, wire-gripping jaws on the slide, and stops at opposite sides of the slide for arresting its movement, one of said stops being arranged to act on the bar and move it toward perpendicularity with the bar to release the clamps.

40. In a staple forming and driving machine, in combination with a driver bar, a slide having friction clamps embracing said bar, a link extending across said clamps and bar at one side and a disk at the other, pins connected with said link and disk and engaging the outer sides of the clamps, a stud on said disk near one of said pins held in a recess of the slide, a spring connected to the clamps forcing them in opposite directions, whereby the reaction of the link and pin draws them against the bar, and a stop for limiting the movement of the slide in one direction arranged to be engaged by the edge of the disk, whereby the latter is turned about said stud as a pivot and the clamp most remote therefrom is released from the bar.

41. In a staple forming and driving machine, a staple former, and a driver traveling in the same path, the one in advance of the other to shape lengths of wire into staples prior to driving, a driver bar, positive connecting means through which said driver bar advances said staple former, said means being disconnectible to permit further advance of the driver, and a stop against which said means is brought upon disconnection thereof from said bar, to limit further movement of the staple former.

42. In a staple-forming and driving machine, a staple former, and a driver traveling in the same path, the one in advance of the other to shape lengths of wire into staples prior to driving, a driver bar, and positive connections through which said driver bar advances said staple former, said connections being disconnectible to permit further advance of the driver and being reconnectible to a different part of the driver bar to return the staple former.

43. In a staple driving and forming machine, a staple former, a driver movable between the limbs of said former, a common actuator for said former and driver, a clutch device for connecting said former to said actuator, and mechanism for disengaging said clutch from said actuator during each stroke thereof, and subsequently connecting the clutch to the actuator at another point.

44. In a staple making and driving machine, a reciprocating driver bar having a driving head, a staple former embracing said bar and movable longitudinally thereon, a clutch for securing said former to the bar so that it may be forcibly advanced to bend wire into staples, a stop and means for disconnecting said clutch to free the staple former and engaging the clutch with said stop to limit further travel of the staple former.

45. In a staple driving and forming machine, a staple former, a driver movable between the limbs of said former, a common actuator for said former and driver, a clutch device for connecting said former to said actuator, and cam means respectively carried by, and external to, said actuator for moving said clutch device positively into and out of connection with the actuator at different points thereof.

46. In a staple making and driving machine, a reciprocating driver bar having a driving head, a staple former embracing said bar and movable longitudinally thereon, a clutch for securing said former to the bar so that it may be forcibly advanced to bend wire into staples, means external to the driver bar for disconnecting said clutch to free the staple former, and means carried by the bar for reconnecting the clutch to another part of the bar after the driving of the staple and prior to the return of the bar.

47. In a staple making and driving machine, a reciprocating driver bar having a driving head, a staple former embracing said bar and movable longitudinally thereon, a clutch for securing said former to the bar so that it may be forcibly advanced to bend wire into staples, means for disconnecting said clutch to free the staple former, means for connecting said clutch to the bar at a different point whereby to return the staple former, and means for again disconnecting and reconnecting the former to the bar in the operative position.

48. In a staple making and driving machine, a reciprocating driver bar having a driving head, a staple former embracing and sliding on said bar, a clutch block sliding transversely on said former, adapted to engage a shoulder on the side of the bar, and means for sliding said block back and forth.

49. In a staple making and driving machine, a reciprocating driver bar having a driving head, a staple former embracing and sliding on said bar, a clutch block sliding transversely on said former, adapted to enter a notch in the side of the bar, and abutments on the machine frame and bar alternately engaging cam surfaces on said block to move it into and out of such notch.

50. In a staple making and driving machine, a reciprocating driver bar having a driving head, a staple former embracing and sliding on said bar, a clutch block sliding transversely on said former adapted to enter a notch in the side of the bar, and having inclined surfaces on its ends and intermediate its ends, shoulders on the machine frame, and beveled projections on the bar arranged to engage said surfaces alternately and move the block into and out of such notches.

51. In a machine of the character described, a driver bar having a shoulder and an overhanging lip on its front face, a spring set into such face with its end nearest said shoulder inclined outward, and a driver head having a shoulder to be engaged by the projecting end of said spring and to be held thereby with its end against the shoulder and under the lip of the bar.

52. In a machine of the character described, a driver bar having a shoulder and an overhanging lip on its front face, and projections on its sides, a spring set into such face with its end nearest said shoulder inclined outward, a staple former having limbs embracing said bar and being internally grooved to receive said side projections, said limbs having also internal driver guideways, and a driver head having edge flanges contained and held in such guideways, and a shoulder to be engaged by the projecting end of said spring and to be held thereby with its end against the shoulder and under the lip of the bar.

53. In a wire-stitching machine, in combination with a staple driver and a wire feeder, a wire-cutting knife for severing staple blanks from the end of the wire, and a knife actuator arranged to be moved by the driver at the termination of its operative movement to operate the knife.

54. In a wire-stitching machine, in combination with a staple driver and a wire feeder, a knife guide across which the wire is fed, a wire-cutting knife for severing staple blanks from the end of the wire arranged to move in said guide, being guided therein independently of its actuator, an actuator for said knife movable parallel with the driver and operated thereby, and an intermediate sliding member engaged with said knife and actuator for communicating motion to the former in a different direction from that of the latter.

55. In a wire-stitching machine, in combination with a staple driver and a wire feeder, a knife guide across which the wire is fed, a wire-cutting knife for severing staple blanks from the end of the wire arranged to move in said guide, an actuator for said knife movable parallel with the driver and operated thereby, and an intermediate member slidingly engaged with the knife and actuator and guided to move in a path at an inclination to the paths of said knife and actuator, whereby said actuator is enabled to move the knife transversely to its own motion.

56. In a wire-stitching machine, in combination with a staple driver and a wire feeder, a knife guide across which the wire is fed, a wire-cutting knife for severing staple blanks from the end of the wire arranged to move in said guide, an actuator for said knife movable parallel with the driver and operated thereby, and an intermediate member slidingly engaged with the knife and actuator and guided to move in a path at an inclination to the paths of said knife and actuator, whereby said actuator is enabled to move the knife transversely to its own motion, the sliding engagement between said member and the knife permitting the latter to be adjusted so as to vary the length of blank cut without projecting or retracting the knife.

57. A wire-stitching machine, comprising a driving bar, a wire feeder operated thereby to feed wire in the same direction, a knife holder, a wire-severing knife arranged to move in said holder in a direction transverse to the wire, a knife actuator movable in the same direction as said driving bar and operated thereby, and a slide guided to move in a path at an inclination to those of said actuator and knife and slidingly connected to both, whereby to transmit motion to the knife.

58. A wire-stitching machine comprising a driver; a wire feeder operable to feed the wire in the direction of travel of said driver, severing means, and a holder for said means adjustable in the same direction to vary the length of pieces severed from the wire.

59. A wire-stitching machine comprising a driver; a wire feeder operable to feed the wire in the direction of travel of said driver, severing means, a holder for said means adjustable in the same direction to vary the length of pieces severed from the wire, and connections by which said driver operates said severing means in all positions of adjustment of the latter and its holder.

60. A wire-stitching machine comprising reciprocating driving means, a wire feeder operated thereby and in the same direction, a cutter carrier adjustable in the same direction also, a cutter mounted in said carrier and operable in a transverse direction, and connections through which said driving means operates said cutter.

61. In a wire stitching machine, a cutter carrier having a wire guide, adjustable in the direction of feed of the wire, a cutter guided in said carrier to move across the wire guide, a cutter actuator movable in the direction of feed of the wire in operation, and connecting means between said cutter and actuator including a member adapted to slide relatively to said actuator when said carrier is adjusted, while remaining in operative relation with both the actuator and cutter, and provisions for changing the direction of motion imparted from the actuator to said member.

62. A wire-stitching machine comprising a driver, a wire feeder movable in the same direction as said driver, a wire guide, a clamp for the wire coöperating with said guide to retain the wire therein, coöperating cutters for shearing the wire, and a cutter actuator having an engagement with said clamp to release the latter when the driver is retracted.

63. In a wire-stitching machine, a slide having a portion across which the wire is led, stationary and movable cutting elements mounted on said slide, and means for operating said movable cutting element, comprising an actuator movable in operation in the direction of the wire, and an intermediate device for changing the direction of motion imparted by the actuator, said slide being adjustable to permit sections of various lengths to be cut from the wire.

64. In a wire-stitching machine, a slide having a portion across which the wire is led, stationary and movable cutting elements mounted on said slide, the latter being adjustable to enable sections of various lengths to be cut from the wire, and means for operating said movable cutting element comprising an actuator movable in operation transversely thereto, and a key member having a sliding connection with the actuator to permit such adjustment of the slide, and being independently guided to move in operation in the same direction as the movable cutting element.

65. In a wire-stitching machine, a wire guide, a clamp adapted to hold wire in said guide, a cutter mounted to move across said guide to sever the wire passing through the same, an actuator moving transversely of said cutter, and a key member having a sliding connection with said actuator and independently guided to move transversely thereto and engaged with both said cutter and clamp for operating them.

66. In a wire stitcher, an adjustable slide having a bracket extending into the path of the wire and containing a wire guide, a wire cutter slidingly mounted on said bracket so as to move across said wire guide, a cutter actuator movable in the direction of adjustment of said slide, an intermediate member guided by a cam element to move in a path at an inclination to that of said actuator, and connected with provision for lateral play thereto, and a key member engaged with said wire cutter and guided by the bracket so as to be movable only in the same direction relatively thereto as the cutter, and having a sliding engagement with said intermediate member so as to be relatively movable in the direction of adjustment of the slide.

67. In a wire stitcher, a driver bar, a shiftable wire feeder thereon, a stop to arrest said feeder and thereby limit the length of wire fed, a wire cutter arranged to act on the wire fed by said feeder, a holder by which said cutter is carried and which is adjustable to vary the length of the staple blanks severed by the cutter, and connections between said cutter-holder and stop by which adjustment of the former correspondingly adjusts the latter by an increased amount.

68. In a wire stitcher, a driver bar, a shiftable wire feeder thereon, a stop to arrest said feeder and thereby limit the length of wire fed, a wire cutter arranged to act on the wire fed by said feeder, a holder by which said cutter is carried and which is adjustable to vary the length of the staple blanks severed by the cutter, and connections between said cutter-holder and stop through which movement of the former moves the latter through twice the distance.

69. In a wire stitcher, a driver bar, a shiftable wire feeder thereon, a stop having a series of teeth and adapted to arrest said feeder and thereby limit the length of wire fed, a wire cutter arranged to act on the wire fed by said feeder, a holder by which said cutter is carried and which is adjustable to vary the length of the staple blanks severed by the cutter, and a portion of which resides near said stop, a stationary rack beside the said portion of the cutter holder, and a pinion carried by the cutter holder and meshing with the teeth of said rack and of the stop, whereby the latter is moved a double distance whenever the cutter-holder and cutter are adjusted.

70. A wire stitcher comprising a frame, a staple driver, an adjustable cutter-carrying slide, and a wire feeder operated by said driver, all mounted on said frame, a jack adjustably connected with said frame, clenchers mounted on the jack, an adjuster for moving the jack toward or from the driver, and a lever engaged with the jack and cutter-carrying slide for adjusting the latter to correspond with the adjustment of the jack.

71. A wire stitcher comprising a frame, a staple driver, an adjustable cutter-carrying slide, and a wire feeder operated by said driver, an adjustable stop for limiting the travel of said feeder and the length of wire fed thereby, all mounted on said frame, a jack adjustably connected with said frame, clenchers mounted on the jack, an adjuster for moving the jack toward or from the driver, a lever engaged with the jack and cutter-carrying slide for adjusting the latter to correspond with the adjustment of the jack, and multiplying connections between the slide and feeder stop for simultaneously changing the adjustment of the latter by an increased amount.

In testimony whereof I have affixed my signature, in presence of two witnesses.

THOMAS A. BRIGGS.

Witnesses:
EDWARD E. SPENCER,
GEORGE A. LOOMIS.